United States Patent
Kang et al.

(10) Patent No.: US 10,506,673 B2
(45) Date of Patent: Dec. 10, 2019

(54) BACK PLATE, BACKLIGHT MODULE, DISPLAY DEVICE, AND ASSEMBLY METHOD OF BACKLIGHT MODULE

(71) Applicants: BOE TECHNOLOGY GROUP CO., LTD., Beijing (CN); HEFEI BOE DISPLAY LIGHTING CO., LTD., Hefei, Anhui (CN)

(72) Inventors: Yaling Kang, Beijing (CN); Xiaochu Zhang, Beijing (CN); Zuchuan Shi, Beijing (CN); Shuyong He, Beijing (CN); Bo Wu, Beijing (CN); Xiang Liu, Beijing (CN); Peina Wang, Beijing (CN)

(73) Assignees: BOE TECHNOLOGY GROUP CO., LTD., Beijing (CN); HEFEI BOE DISPLAY LIGHTING CO., LTD., Hefei, Anhui (CN)

( * ) Notice: Subject to any disclaimer, the term of this patent is extended or adjusted under 35 U.S.C. 154(b) by 127 days.

(21) Appl. No.: 15/548,521

(22) PCT Filed: Jan. 25, 2017

(86) PCT No.: PCT/CN2017/072619
§ 371 (c)(1),
(2) Date: Aug. 3, 2017

(87) PCT Pub. No.: WO2017/185845
PCT Pub. Date: Nov. 2, 2017

(65) Prior Publication Data
US 2018/0242412 A1    Aug. 23, 2018

(30) Foreign Application Priority Data
Apr. 27, 2016 (CN) .......................... 2016 1 0281018

(51) Int. Cl.
*H05B 33/08* (2006.01)
*F21S 4/28* (2016.01)
*F21V 8/00* (2006.01)

(52) U.S. Cl.
CPC ............ *H05B 33/0803* (2013.01); *F21S 4/28* (2016.01); *G02B 6/009* (2013.01); *G02B 6/0011* (2013.01); *G02B 6/0068* (2013.01)

(58) Field of Classification Search
CPC .... G02B 6/0018; G02B 6/002; G02B 6/0088; G02B 6/0011; H05B 33/0803; F21S 4/28
See application file for complete search history.

(56) References Cited

U.S. PATENT DOCUMENTS

| | | | |
|---|---|---|---|
| 7,708,444 B2 * | 5/2010 | Sakai | G02B 6/0013 362/608 |
| 2006/0114694 A1 | 6/2006 | Cho et al. | |
| 2015/0362161 A1 | 12/2015 | Gao et al. | |

FOREIGN PATENT DOCUMENTS

| CN | 1782813 A | 6/2006 |
|---|---|---|
| CN | 1028091321 A | 12/2012 |

(Continued)

OTHER PUBLICATIONS

The First Chinese Office Action dated Aug. 31, 2017; Appln. No. 201610281018.2.

(Continued)

*Primary Examiner* — Mary Ellen Bowman

(57) ABSTRACT

A back plate, a backlight module, a display device, and an assembly method of the backlight module are provided. The backlight module includes: a back plate, including a main body portion, the main body portion having a first main surface and a second main surface opposite to each other; and the main body portion being provided with a hollow structure; a light source, passing through the hollow structure from a second main surface side of the main body (Continued)

portion; a light guide plate, provided on the first main surface side of the main body portion of the back plate, wherein, the light-emitting portion of the light source includes a light emergent surface, and the light emergent surface faces a light incident surface of the light guide plate.

16 Claims, 3 Drawing Sheets

(56) References Cited

FOREIGN PATENT DOCUMENTS

| | | |
|---|---|---|
| CN | 203250090 A | 10/2013 |
| CN | 103899979 A | 7/2014 |
| CN | 203686786 U | 7/2014 |
| CN | 203811947 U | 9/2014 |
| CN | 104089243 A | 10/2014 |
| CN | 104235700 A | 12/2014 |
| CN | 104279465 A | 1/2015 |
| CN | 105782820 A | 7/2016 |
| CN | 205640523 U | 10/2016 |
| KR | 1020120005786 A | 1/2012 |

OTHER PUBLICATIONS

The International Search Report and Written Opinion dated May 2, 2017; PCT/CN2017/072619.

* cited by examiner

BACK PLATE, BACKLIGHT MODULE, DISPLAY DEVICE, AND ASSEMBLY METHOD OF BACKLIGHT MODULE

TECHNICAL FIELD

The present disclosure relates to a back plate, a backlight module, a display device, and an assembly method of the backlight module.

BACKGROUND

A backlight module generally comprises a back plate, a light guide plate provided on a side of the back plate, and a light source provided facing the light guide plate, for example, a light-emitting diode (LED) light source. In order to improve luminous efficiency of the backlight module, for example, an optical component, e.g., a reflection sheet, a diffusion sheet, and a brightness enhancement film, etc., may be further provided. With respect to a back plate with a U-bent structure, when the backlight module is being assembled, a light bar is generally inserted in the U-fold structure from a front side. Under a normal circumstance, the U-bent structure has a smaller opening, so assembly of the light bar is more difficult, and a circumstance, e.g., inaccurate positioning or even deformation of the light bar, etc. is apt to occur, affecting luminous efficiency of the light source.

SUMMARY

One embodiment of the disclosure provides a backlight module, comprising: a back plate, comprising a main body portion, the main body portion having a first main surface and a second main surface opposite to each other; and the main body portion being provided with a hollow structure; a light source, passing through the hollow structure from a second main surface side of the main body portion, and a light-emitting portion of the light source being exposed on a first main surface side of the main body portion; a light guide plate, provided on the first main surface side of the main body portion of the back plate, wherein, the light-emitting portion of the light source includes a light emergent surface, and the light emergent surface faces a light incident surface of the light guide plate.

Another embodiment of the disclosure provides a display device comprising the backlight module as mentioned above.

Another embodiment of the disclosure provides a n assembly method of the backlight module as mentioned above, comprising: providing the back plate, the light source, and the light guide plate; providing the light guide plate on the first main surface side of the back plate, making the light source pass through the hollow structure from the second main surface side of the main body portion of the back plate, so that the light-emitting portion of the light source is exposed on the first main surface side of the main body portion, and the light emergent surface of the light-emitting portion faces the light incident surface of the light guide plate.

Still another embodiment of the disclosure provides a back plate used for the backlight module as mentioned above.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

An embodiment of the present disclosure provides a back plate, comprising: a main body portion having a plate-like structure, the main body portion including a first main surface and a second main surface opposite to each other; and an extension portion, the extension portion including a first portion extending from a first edge of the main body portion in a direction intersecting with the first main surface, and a second portion extending from a side of the first portion opposite to a side connected with the main body portion toward a middle portion of the main body portion, the second portion and the main body portion being spaced apart from each other and at least partially overlapping in a thickness direction of the main body portion; wherein, a portion of the main body portion close to the extension portion is provided with a hollow structure.

For example, the second portion and the main body portion being spaced from each other refers to that the two are not in contact with each other; the main body portion is a plate-like structure, having a certain thickness, and the thickness direction of the main body portion refers to, for example, a direction perpendicular to a first main surface or a second main surface of the main body portion. The second portion and the main body portion at least partially overlapping refers to, for example, a projection of the second portion along the thickness direction on a plane parallel to the main body portion at least partially overlapping with a projection of the main body portion on the above-described plane. For example, the projection of the above-described second portion may completely fall within the projection of the above-described main body portion, or only a portion thereof may fall within the projection of the above-described main body portion; with respect to the above-described extension portion, it may form a U-bent portion with the main body portion, and the U-bent portion may be used, for example, in a light guide plate for seizing the backlight module. With the back plate of the structure, the light bar may be conveniently and accurately mounted, so as to obtain the backlight module with better luminous efficiency.

Figure 1:
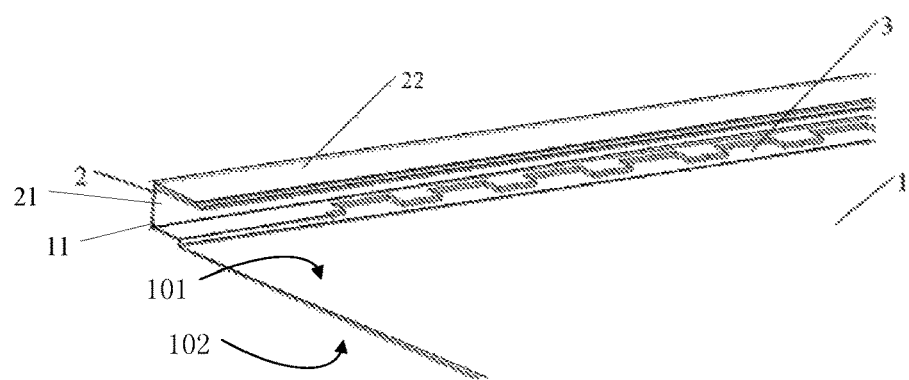
FIG. 1 is a stereoscopic schematic diagram of a back plate structure according to an embodiment of the present disclosure.

With reference to FIG. 1, the back plate includes a main body portion 1 and an extension portion 2. The main body portion 1 includes a first main surface 101 and a second main surface 102 opposite to each other. The extension portion includes a first portion 21 extending from an edge 11 of the main body portion 1 in a direction intersecting with the first main surface 101, and a second portion 22 extending from a side of the first portion 21 opposite to a side connected with the main body portion 1 toward a middle portion of the main body portion 1, the second portion 22 and the main body portion 1 being spaced apart from each other and at least partially overlapping in a thickness direction of the main body portion 1. A portion of the main body portion 1 close to the extension portion 2 is provided with a hollow structure 3. With further reference to FIG. 1, the second portion 22 of the extension portion 2 is, for example, parallel to the first main surface, and the first portion 21 is, for example, perpendicular to the first main surface. For example, an extending direction of the hollow structure 3 may be the same as an extending direction of the first portion 21 of the extension portion 2.

It should be noted that, a shape and a size of the extension portion are not particularly limited and may be selected according to actual needs. The extension portion may be formed, for example, by folding one edge of the back plate for a first time and then folding it for a second time. For example, the extension portion may also be integrally formed by a mold. For example, the back plate may also be formed by fixedly connecting a substantially planar main body portion and a separate extension portion with each other. In addition, with respect to the extension portion, it is not necessarily that one edge of the back plate is completely bent, and it may also be partially bent. A structure of the extension portion and a mode in which it is formed are not particularly limited in the present disclosure. In general, according to a particular field in which the back plate is applied, the extension portion is provided at the edge of the back plate. Specifically, with respect to a substantially rectangular back plate, the extension portion is provided only at one side edge thereof.

It should be noted that, although in the above-described embodiment, it is illustrated with a case where the back plate includes the extension portion as an example, yet the back plate according to the embodiment of the present disclosure is not limited thereto, and the back plate according to the embodiment of the present disclosure may not be provided with the above-described extension portion. In addition, the extension portion and the main body portion as described above may also be formed by folding a same sheet material or by connecting different sheet materials. The first portion and the second portion of the above-described extension portion may also be referred to a first bent portion and a second bent portion. For example, the first bent portion is bent from the first edge of the main body portion toward a first main surface side, and the second bent portion is bent from an edge of the first bent portion away from the main body portion toward the middle portion of the main body portion, the second bent portion and the main body portion are spaced apart from each other and at least partially overlap in a direction perpendicular to first main surface. Therefore, the first bent portion, the second bent portion and the main body portion may also form the above-described U-bent structure.

In addition, the portion of the main body portion close to the extension portion is provided with a hollow structure. For example, the hollow structure plays a role in that after the light bar is fixed from a back surface of the back plate, an LED chip on the light bar can pass through the hollow structure, and then a light emergent surface thereof is provided facing a light incident surface of the light guide plate provided on a front surface of the back plate. The front surface of the back plate refers to a side where the light guide plate is provided. That is, the hollow structure according to the embodiment of the present disclosure needs to ensure that the LED chip on the light bar is able to pass through the hollow structure. For example, the hollow structure may at least partially overlap or not overlap with the extension portion in the thickness direction of the main body portion of the back plate.

In one embodiment, for example, the first portion is perpendicular to the first main surface and the second portion is parallel to the first main surface.

In one embodiment, the hollow structure extends parallel to the first edge, the portion of the main body portion along the first edge includes a step structure, the step structure including a bent portion bent toward the second portion of the extension portion and a connecting portion connecting the edge of the bent portion close to the second portion and the first edge of the main body portion, and the hollow structure is located at the bent portion and a portion of the connecting portion close to the bent portion.

Figure 2:
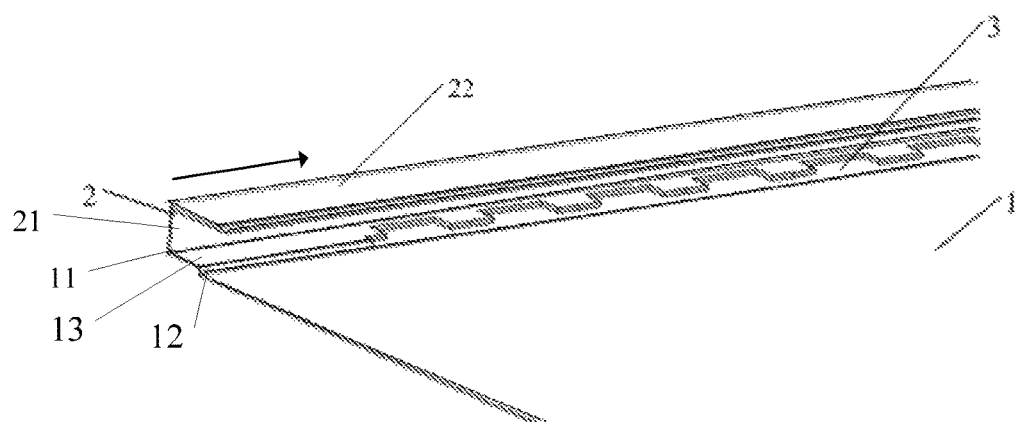
FIG. 2 is a stereoscopic schematic diagram of a back plate comprising a hollow structure and a step structure according to an embodiment of the present disclosure.

With reference to FIG. 2, the back plate comprises a main body portion 1 and an extension portion 2 provided at an edge of the main body portion 1. The extension portion 2 has, for example, a structure as described above. With further reference to FIG. 2, a first portion 21 of the extension portion 2 extends in a first direction (a direction indicated by an arrow in the diagram). For example, the extension portion 2 may be formed by completely folding one edge of the back plate. A portion of the main body portion 1 close to the extension portion 2 is provided with a hollow structure 3 which is used for, for example, cooperating with the LED light bar. The hollow structure 3 extends parallel to the first edge 11 of the main body portion (i.e., a direction indicated by an arrow in FIG. 2). A portion of the main body portion 1 along the first edge 11 includes a step structure, the step structure including a bent portion 12 bent toward a second portion 22 of the extension portion 2 and a connecting portion 13 connecting an edge of the bent portion 12 close to the second portion 22 and the first edge 11 of the main body portion 1 (only a portion of the step structure is shown in the diagram), and the hollow structure 3 is located at the bent portion 12 and a portion of the connecting portion 13 close to the bent portion 12. By providing a step, after the light bar is mounted, a surface provided with the LED chip is flush with a surface of the light guide plate close to the first main surface of the back plate, so as to take full advantage of luminous efficiency. The back plate provided with the step structure can further make the backlight module thinner.

In this embodiment, the back plate comprises an un-hollow portion on both sides in the extending direction of the hollow structure, respectively.

In the above-described embodiment, a length of the hollow structure matches a length of the light bar, for example, it is greater than or equal to the length of the light bar, so that the light bar can be mounted in place, to ensure luminous efficiency of the LED chip.

In one embodiment, the bent portion of the step structure has a size in the thickness direction of the main body portion within a range of 0.1 mm to 0.3 mm. The size is, for example, equal to a thickness of a light bar base, so as to ensure that after the light bar is mounted from the back surface of the back plate, a back surface of the light bar base is flush with the second main surface of the main body portion of the back plate, so that the entire backlight module is thinner. At the same time, a front surface of the light bar base is on a same plane as a bottom surface of the light guide plate (a surface close to the first main surface of the back plate), and further, light emitted from the light emergent surface of the LED can enter into the light incident surface of the light guide plate more sufficiently, to improve luminous efficiency.

In one embodiment, the hollow structure and the extension portion at least partially overlap with each other in the thickness direction of the main body portion of the back plate. By limiting positional relationship between the hollow structure and the extension portion, the structure of the backlight module can be made more compact.

Figure 3:
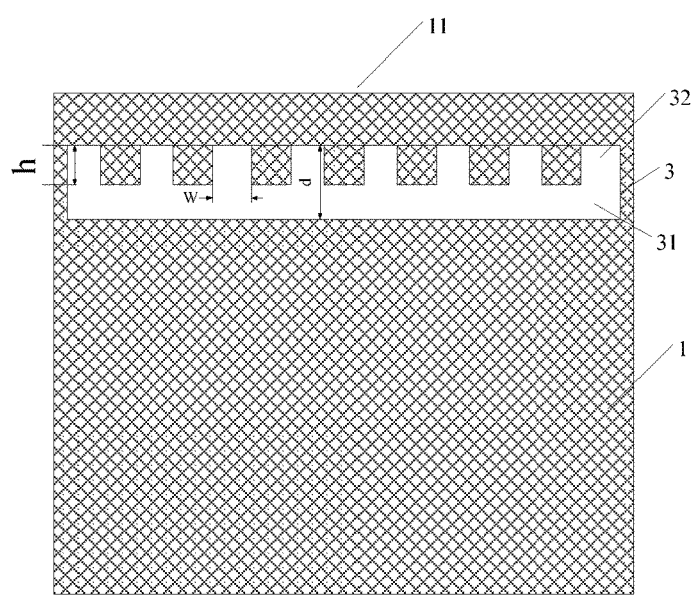
FIG. 3 is a top-view schematic diagram of a main body portion provided with a hollow structure according to an embodiment of the present disclosure.

In one embodiment, as seen from a plan-view diagram parallel to the first main surface of the main body portion, the hollow structure includes a strip structure extending along the first edge of the main body portion, and a plurality of protrusion structures protruding from the strip structure toward the first edge and arranged at intervals in a direction parallel to the first edge. FIG. 3 is a top-view schematic diagram of a main body portion provided with a hollow structure according to an embodiment of the present disclosure. With reference to FIG. 3, a main body portion 1 (a shaded region) is provided with a hollow structure 3 (a white region). The hollow structure 3 includes a strip structure 31 extending along the first edge 11 and a plurality of protrusion structures 32 protruding from the strip structure 31 toward the first edge 11 and arranged at intervals in a direction parallel to the first edge 11. The hollow structure is provided with a plurality of protrusions, which, on the one hand, can improve positioning accuracy of the LED; and on the other hand, can play a role in protecting the LED chip and improve strength of mounting the light bar on the back plate, and so on.

With reference to FIG. 3, a size h of the above-described protrusion structure 32 in an extending direction perpendicular to the first edge 11 and a distance d between a side of the hollow structure 3 close to the first edge 11 and a side thereof away from the first edge satisfy $d/2 \leq h \leq 3d/4$. For example, h satisfies 0.8 mm$\leq$h$\leq$1.3 mm. With reference to FIG. 3, h refers to a size of the protrusion structure 32 in the extending direction perpendicular to the first edge 11. If h is too small, it cannot effectively protect the LED chip. The reason is that most of the LED chips are exposed out of the protrusion structure 32, and when the backlight module is being assembled, the light guide plate or other optical components may squeeze these LED chips, which thus causes damage to the LED chips. On the other hand, h cannot be too large; otherwise, it will result in an excessively large distance between a light emergent surface of the LED chip and a light incident surface of the light guide plate, affecting utilization of light. By adjusting an h value, it is possible to effectively protect the LED chip, and at the same time, make light emitted from the LED chip to enter into the light incident surface of the light guide plate as far as possible.

For example, the size of the protrusion structure in a direction parallel to the first edge is within a range of 3.2 mm to 4.4 mm. With reference to FIG. 3, the size W satisfies 3.2 mm$\leq$W$\leq$4.4 mm. On the one hand, if W is too large, it cannot play a role in effectively protecting and positioning the LED chip; on the other hand, if W is too small, it will cause difficulty in mounting the LED chip, or damage to the LED chip. By adjusting the W value, it is possible to facilitate mounting, and at the same time, effectively protect and position the LED chip.

In one embodiment, a distance between a side of a hollow structure 3 away from a first edge 11 and a side thereof close to the first edge 11 may be, for example, greater than a size of a protrusion structure 32 in an extending direction perpendicular to the first edge 11. That is, there is a certain distance from the protrusion structure 32 to the side of hollow structure 3 away from the first edge 11, so as to expose a portion of a surface of a light guide plate on a second main surface side of a back plate through the hollow structure 3. Thus, when a light bar is attached from the other side of the back plate, a side of the light bar provided with an LED chip may be attached to the portion of the surface of the light guide plate. That is to say, in a width direction of the light bar, portions of the light bar located on both sides of the LED chip are, for example, respectively attached to the back plate and the portion of the surface of the light guide plate which is close to the first main surface side of the back plate and exposed out through the hollow structure, so as to improve strength of fixing the light bar, and make full use of light emitted from the LED chip.

In one embodiment, a sidewall of the main body portion surrounding the hollow structure is coated with an insulating layer. The LED chip is soldered to, for example, a printed circuit board by soldering, so that part of welding angles may be left. If these welding angles are in contact with the back plate, short circuit may occur, so that the LED chip does not work properly. For example, an insulating layer may be provided on an inner wall of the main body portion of the back plate surrounding the hollow structure (i.e., the insulating layer is provided on the surface of the entire hollow structure) and on a portion where the printed circuit board and the back plate are in contact with each other. For example, a material of the insulating layer may be plastic or rubber, or other material having an insulating effect. For example, when plastic is used as the insulating layer, it can be molded in a corresponding position on the back plate by using an insert injection molding technology. When rubber is used as an insulating material, it may also play a role in buffering, when the backlight module is subjected to an external force, so as to ensure that there is no cracked soldering at a welded corner, and avoid damage to the LED chip. An arrangement position of the insulating layer and an arrangement method the insulating layer material may be determined according to actual needs, which will not be limited in the present disclosure.

Another aspect of the present disclosure provides a backlight module comprising the above-described back plate, a first portion of an extension portion of the back plate extending in a direction from the second main surface to the first main surface, and the backlight module further comprising: an LED light bar, provided on a second main surface side of the main body portion, and including a strip base and a plurality of LED chips spaced arranged at intervals along an extending direction of the strip substrate; a light guide plate, provided on a first main surface side of the main body portion of the back plate, wherein, the LED chip of the LED light bar passes through the hollow structure, and a light emergent surface of the LED chip faces a light incident surface of the light guide plate. By providing the hollow structure in a portion of the back plate close to the extension portion, and arranging the LED light bar from the other side of the back plate, accurate positioning may be performed conveniently on the light bar, to avoid bending and deformation of the light bar, and to ensure luminous efficiency of the light source.

It should be noted that, the extension portion is located on the first main surface side. That is to say, one side of the first portion of the extension portion intersects with the first main surface, the other side extends in a direction away from the first main surface and the second main surface, and the second portion and the first main surface are provided opposite to each other and spaced apart.

It should be noted that, the backlight module may further include other elements and components, for example, a reflection sheet, a diffusion sheet, a brightness enhancement film, etc., and no limitative explanation should be performed by those skilled in the art on the present disclosure. Such a back plate whose edge has an extension portion, for example, may be applied to a laptop computer, a tablet personal computer, and the like.

In addition, as described above, the first portion of the extension portion is, for example, perpendicular to the first main surface, and the second portion is, for example, parallel to the first main surface.

Figure 4A:
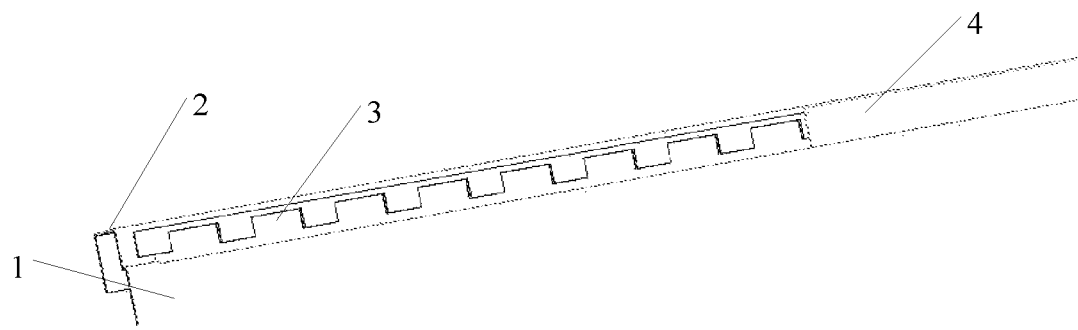
FIG. 4A is a stereoscopic schematic diagram of a back plate mounted with a light bar according to an embodiment of the present disclosure.
Figure 4B:
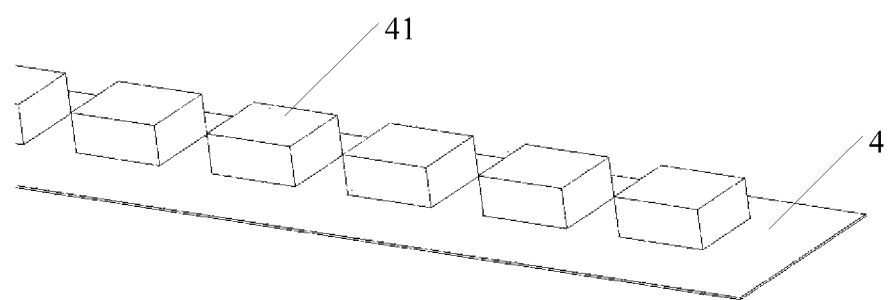
FIG. 4B is a stereoscopic schematic diagram of an LED light bar according to an embodiment of the present disclosure.
Figure 4C:
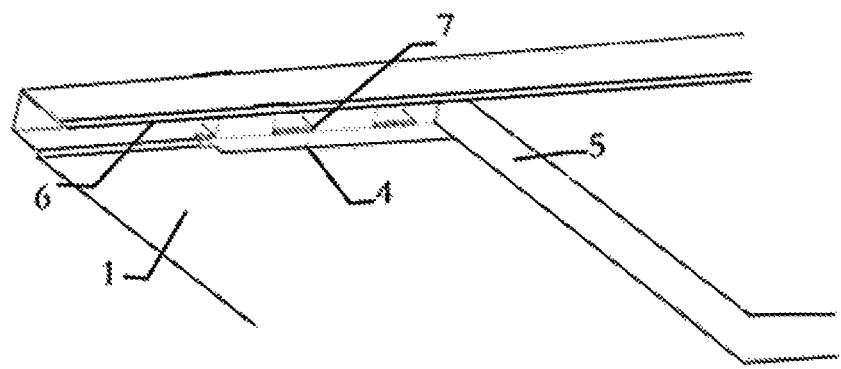
FIG. 4C is a stereoscopic schematic diagram of a backlight module structure according to an embodiment of the present disclosure.
Figure 4D:
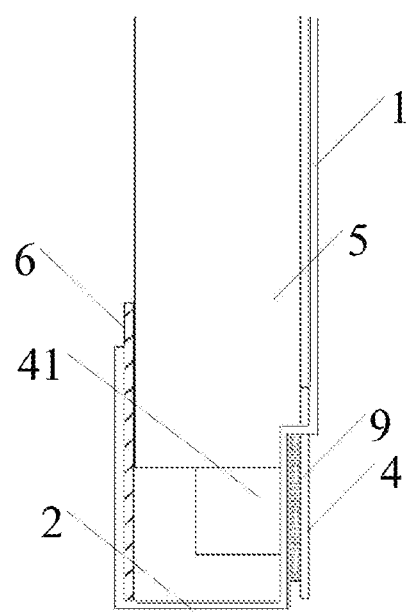
FIG. 4D is a cross-sectional schematic diagram of a backlight module according to an embodiment of the present disclosure.

FIG. 4A is a stereoscopic schematic diagram of a back surface structure of the backlight module according to the embodiment of the present disclosure; FIG. 4B is a stereoscopic schematic diagram of the LED light bar according to the embodiment of the present disclosure; FIG. 4C is a stereoscopic schematic diagram of a front surface structure of the backlight module according to the embodiment of the present disclosure; and FIG. 4D is a cross-sectional schematic diagram of the backlight module according to the embodiment of the present disclosure. With reference to FIG. 4a to FIG. 4d, the backlight module comprises a back plate, an LED light bar 4, and a light guide plate 5 provided on a first main surface side of the back plate; an edge of the back plate is provided with an extension portion 2, a portion of the back plate close to the extension portion 2 is provided with a hollow structure 3; the LED light bar 4 is provided from a second main surface side of the back plate, and an LED chip 41 passes through the hollow structure 3; on the first main surface side of the back plate, a light emergent surface of the LED chip 41 is provided facing a light incident surface of the light guide plate 5.

Hereinafter, a specific structure of the backlight module according to the embodiment of the present disclosure will be described in detail with reference to FIG. 4A to FIG. 4D.

FIG. 4A is a stereoscopic diagram of the back surface structure of the backlight module. With reference to FIG. 4A, the back plate comprises an extension portion provided at an edge thereof and a main body portion 1 connected with the extension portion; the portion of the back plate close to the extension portion 2 is provided with the hollow structure 3. For example, as described above, the hollow structure 3 includes a strip structure 31 extending along a first edge 11 of the main body portion 1, and a plurality of protrusion structures 32 protruding from the strip structure 31 toward the first edge 11 and arranged at intervals in a direction parallel to the first edge 11. The LED chip on the light bar 4 is embedded into the protrusion structure 32 from the second main surface side of the back plate (only a portion of the light bar is shown in the diagram). In addition, as shown in the diagram, portions of the light bar 4 located on both sides of the LED chip in a width direction thereof may be respectively attached to, for example, the second main surface side of the back plate and a portion of a surface of the light guide plate exposed out of the hollow structure 3, so as to improve an effect of fixing the light bar.

In one embodiment, for example, the hollow structure extends parallel to the first edge, a portion of the main body portion along the first edge includes a step structure, the step structure including a bent portion bent toward the second portion of the extension portion and a connecting portion connecting the edge of the bent portion close to the second portion and the first edge, and the hollow structure is located at the bent portion and a portion of the connecting portion close to the bent portion.

FIG. 4B is a stereoscopic schematic diagram of the LED light bar according to the embodiment of the present disclosure. As shown in FIG. 4B, the LED light bar 4 includes a strip base 42 and an LED chip 41 located on the strip base 42. In the extending direction of the strip base 42, the LED chips 41 are arranged at intervals.

FIG. 4C is a stereoscopic diagram of the front surface structure of the backlight module according to the embodiment of the present disclosure. With reference to FIG. 4C, the hollow structure 3 is provided close to the extension portion and extends parallel to the first edge of the main body portion, the portion of the main body portion along the first edge includes a step structure, the step structure including a bent portion bent toward the second portion of the extension portion and a connecting portion connecting the edge of the bent portion close to the second portion and the first edge, and the hollow structure is located at the bent portion and a portion of the connecting portion close to the bent portion. By providing the step structure, the light bar and the surface of the light guide plate close to the first main surface side of the back plate may be brought into close contact with each other, so as to ensure that light emitted from the light emergent surface of the LED sufficiently enters into a light incident surface of the light guide plate. With respect to the step structure and the hollow structure, the previous drawings and description may be referred to.

With further reference to FIG. 4C, the light guide plate 5 is provided on the first main surface side of the back plate (only a portion of the backlight module is shown in the diagram, to schematically show the hollow structure of the back plate). After the light guide plate 5 and the LED light bar are mounted in place, the light incident surface of the light guide plate 5 and the light emergent surface of the LED chip on the light bar 4 provided from the second main surface side of the back plate face each other.

In this embodiment, for example, a size of the bent portion of the step in the thickness direction of the main body portion is substantially the same as a thickness of a base of the LED light bar. With further reference to FIG. 4C, for example, the size of the bent portion of the step in the thickness direction of the main body portion is the same as the thickness of the base of the light bar 4, so that, one surface of the base of the LED light bar 4 may be flush with a surface of the second main surface side of the back plate, so that the backlight module is made thinner. It should be noted that, an adhesive tape 9 in FIG. 4D is highlighted with a large thickness, while the thickness of the adhesive tape 9 in an actual product may be very small. At the same time, the other surface of the base of the LED light bar 4 is located on a same plane as the surface of the light guide plate 5 close to the first main surface of the back plate, so as to further ensure that light emitted from the light emergent surface of the LED chip on the light bar 4 sufficiently enter into the light incident surface of the light guide plate 5, to improve display brightness of the display device.

For example, the step structure in the above-described back plate is arranged such that the main body portion is divided into a first portion and a second portion that are staggered in a direction perpendicular to the first main surface, and the hollow structure is located in the first portion. For example, as shown in FIG. 2, a portion of the main body portion located in the top left of a component indicated by a reference sign "12" may be the first portion, and a portion of the main body portion located in the bottom right thereof may be the second portion. In this case, as shown in FIG. 4D, a distance between the first portion and the second portion of the main body portion in the direction perpendicular to the first main surface is substantially the same as the thickness of the strip base of the light source.

In one embodiment, portions of the base of the light bar (a side on which the LED chip is provided) located on both sides of the LED chip in its width direction may be respectively fixed with the other side surface of the back plate and the portion of the surface of the light guide plate exposed out of the hollow structure. For example, the fixing means may be bonding to each other, or may be screwing, or other means. Thus, light emitted from the LED chip may be used fully, and a backlight module structure is made compact, to implement thinning of the backlight module.

In one embodiment, in the thickness direction of the back plate, the hollow structure at least partially overlaps with the extension portion. For example, the LED chip is provided on a side of the hollow structure close to the first edge, so that the LED and the second portion of the extension portion at least partially overlap in the thickness direction of the back plate, and thus, the structure of the backlight module is more compact.

In one embodiment, as seen from a plan-view diagram parallel to the first main surface of the main body portion, the hollow structure includes a strip structure extending along the first edge of the main body portion, and a plurality of protrusion structures protruding from the strip structure toward the first edge and arranged at intervals in a direction parallel to the first edge (in combination with the previous drawings and description), and the LED chip in the LED light bar is at least partially embedded into the protrusion structure. As shown in FIG. 4A to FIG. 4C, the LED chip provided on the light bar 4 matches the protrusion structure 31, that is, the LED chip in the LED light bar 4 is at least partially embedded into the protrusion structure 31. As described above, on the one hand, the hollow structure includes the above-described protrusion structure, so that accurate positioning may be performed conveniently on the light bar; on the other hand, it may play a role in protecting the LED chip. For example, it is possible to avoid damage to the LED, when the backlight module is squeezed by an external force.

With respect to relevant sizes of the protrusion structure, the previous description may be referred to.

In one embodiment, as seen from a plan-view diagram parallel to the first main surface of the main body portion, the hollow structure includes a strip structure extending along the first edge of the main body portion, and a plurality of protrusion structures protruding from the strip structure toward the first edge and arranged at intervals in a direction parallel to the first edge. Portions of the base of the LED light bar (a side provided with the LED chip) located on both sides of the LED chip in the width direction of the base are respectively fixed to the second main surface side of the back plate and a portion of the surface of the light guide plate close to the first main surface and exposed out through the hollow structure. For example, the fixing means may be bonding to each other, or may be screwing, or other means. FIG. 4D is a cross-sectional schematic diagram of the backlight module according to the embodiment of the present disclosure, a cut position thereof is a position along a direction of the edge 11 and passing through the LED chip 41 in FIG. 4C. With reference to FIG. 4D, the backlight module comprises a back plate, an LED light bar 4 and a light guide plate 5. The LED light bar is provided thereon with the LED chip 41. A side of the LED light bar 4 located on the LED chip in its width direction (for example, in a direction parallel to the first main surface and perpendicular to the first edge) is attached to the second main surface of the back plate by the adhesive tape 9, and the other side is attached to a portion of the surface of the light guide plate 5 close to the first main surface of the back plate and exposed out through the hollow structure by the adhesive tape 9. A portion of the side of the above-described base provided with the LED chip and located between adjacent LED chips may also be, for example, attached to the second main surface side of the back plate, for example, by an adhesive tape, to further improve a fixing effect. Portions of the light bar located on both sides of the LED chip in its width direction are respectively attached to the back plate and the light guide plate, which can improve the fixing effect of the light bar, to avoid tortuosity and deformation of the light bar, which affects the luminous efficiency.

With further reference to FIG. 4D, after the light bar 4 is provided from the second main surface side of the back plate, the LED chip passes through the hollow structure and is provided facing the light incident surface of the light guide plate 5. For example, there is a certain gap (not shown) between the light incident surface of the light guide plate 5 and the light emergent surface of the LED chip 41, so that the LED can effectively dissipate heat. At the same time, the first portion and the second portion of the extension portion are spaced from the LED by a certain distance. A reflection sheet 6 is also schematically shown in the diagram, which is provided between the light guide plate 5 and the extension portion 2. Further, it is also possible to provide an optical film such as a diffusion sheet, a brightness enhancement film, etc., on the side of the light guide plate away from the back plate.

It should be noted that, a sidewall of the main body portion surrounding the hollow structure may be, for example, coated with an insulating layer. For example, as shown in FIG. 4C, the insulating layer 7 may be coated on the side wall of the main body portion surrounding the hollow structure. For example, it is also possible to provide an insulating material in both portions where the light bar and the back plate are in contact with each other. As previously described, for example, the insulating material may be plastic or rubber. For example, plastic or rubber may be molded in a desired position by using an insert injection molding technology. By providing the insulating material, it is possible to avoid short circuit caused by contact between the welding angle of the LED chip of the light bar and the back plate, to ensure reliable operation of the backlight module. At the same time, if the insulating material provided is a flexible material, for example, flexible plastic or rubber, it may further play a role in protecting the LED chip and LED light bar, to avoid damage to the light bar, when the backlight module is squeezed by an external force.

In addition, in the above-described embodiment, the light source of the backlight module is described with the LED light bar as an example, but according to the embodiment of the present disclosure, it is not limited to the LED light bar. The backlight module according to the embodiment of the present disclosure may be any suitable light source, for example, a cold cathode fluorescent lamp (CCFL) light source. For example, the light source of the backlight module according to the embodiment of the present disclosure includes a strip base and a light-emitting portion provided on the strip base. The light-emitting portion may include a plurality of sub-light-emitting portions arranged at intervals in the extending direction of the strip base. For example, each sub-light-emitting portion may be an LED chip.

According to the above-described embodiment, the main body portion of the back plate includes a first main surface and a second main surface, but it is not limited to that the first main surface and the second main surface are strict planes. For example, in a case where the above-described main body portion includes a step structure, the above-described main surface is not a strict plane, but since a height of the step structure is very small, the main surface of the main body portion may also be a substantially flat surface. In a case where there is a step structure, the direction parallel to or perpendicular to the first main surface may respectively be parallel to or perpendicular to the main surface that is divided into the first portion and the second portion by the step structure. For example, the first portion and the second portion of the main body portion are parallel to each other.

In addition, it should be noted that, the back plate of the backlight module according to the embodiment of the present disclosure may be the back plate according to the embodiment of the present disclosure, and the back plate according to the embodiment of the present disclosure may also be used in the backlight module according to the embodiment of the present disclosure. Thus, the description about the back plate in different embodiments may be combined or replaced with each other.

With respect to the light guide plate of the backlight module according to the embodiment of the present disclosure, it may be any component having a light guide function. For example, it may also include a structure on which various functional layers, e.g., a diffusion layer, a reflective layer, a scattering layer, etc., are formed on a single light guide plate.

As described above, the back plate according to the embodiment of the present disclosure may not be provided with the extension portion, and therefore, the back plate in the backlight module according to the embodiment of the present disclosure may not be provided with the extension portion, either. In this case, an end portion of the light guide plate cannot be fixed by the U-type structure of the back plate, but may be fixed onto the back plate by any other suitable means, e.g., pasting.

In addition, it should be noted that, it is described above with a case where the hollow structure is provided in the vicinity of the first edge of the main body portion of the back plate; however, the "first edge" here is not only limited to the first edge 11 as shown in the diagram. For example, in a case where the main body portion of the back plate is a rectangle, the first edge may be one side, two sides, three sides or four sides of the rectangle, for example, may be two opposite sides of the rectangle. That is to say, the "first edge" of the main body portion may be at least a portion of the entire edge of the main body portion.

According to a further aspect of the present disclosure, there is provided a display device, comprising the backlight module as described above.

According to still another aspect of the present disclosure, there is provided an assembly method comprising the backlight module of the back plate provided in the embodiment of the present disclosure, comprising:

providing a light guide plate and an LED light bar;

providing the light guide plate on a first main surface side of the back plate, so that a light incident surface of the light guide plate is provided between a second portion of the extension portion and the main body portion, providing the LED light bar on a second main surface side of the main body portion of the back plate, and making the LED chip of the light bar pass through the hollow structure, so that a light emergent surface of the LED chip and the light incident surface of the light guide plate face each other.

For example, the assembly method of the backlight module comprises, for example, steps of: with reference to FIG. 2, providing a back plate having an extension portion, and providing a portion of the back plate close to the extension portion as a hollow structure, i.e., a back plate structure provided by the embodiment of the present disclosure. As described above, for example, the hollow structure includes a strip structure extending along a first edge of the main body portion, and a plurality of protrusion structures protruding from the strip structure toward the first edge and arranged at intervals in a direction parallel to the first edge. The arrangement of the extension portion may be, for example, folding a back plate which is a substantially planar structure for a second time, and may also be, for example, integrally formed with a mold or formed by fixedly connecting the back plate of the planar structure and a U-fold structure with each other. The hollow structure is obtained, for example, by means of machining, such as cutting, shaving, and the like. With further reference to FIG. 2, for example, as described above, a portion of the main body portion close to the first edge may also be provided as a step structure, that is, the portion of the main body portion along the first edge includes the step structure, the step structure including a bent portion bent toward the second portion of the extension portion and a connecting portion connecting the edge of the bent portion close to the second portion, and the first edge, and the hollow structure 3 is located at the bent portion and a portion of the connecting portion close to the bent portion. For example, a size of the bent portion of the step structure in the thickness direction of the main body portion may be, for example, the same as a thickness of the light bar. For example, the step structure, the hollow structure, and the extension portion may be prepared, matching with each other. For example, firstly, an edge of a piece of metal plate having a planar structure is bent to form the extension portion; and thereafter, the back plate is bent twice in a position of the back plate at a certain distance from the extension portion, to form a step substantially parallel to the extension portion; and finally, the back plate is hollowed from a middle position of its step toward a side close to the extension portion, to obtain a desired back plate structure.

With reference to FIG. 4B, the LED chip 41 is welded to the light bar 4, for example, by welding. With reference to FIG. 4A, the light bar 4 is attached to the back plate from the second main surface side of the back plate (an opposite side of a side on which the light guide plate is provided), and the LED chip is correspondingly embedded to the respective protrusion structures of the hollow structure.

With reference to FIG. 4G, the light guide plate is provided on the first main surface side of the back plate, and the light incident surface of the light guide plate and the light emergent surface of the LED chip are provided opposite to each other.

It should be noted that, an order of attaching the light bar and providing the light guide plate are not specific required, which may be selected by oneself according to an actual situation, as long as it is ensured that after the LED chip on the light bar passes through hollow structure, the light emergent surface and the light incident surface of the light guide plate provided on the first main surface side of the back plate face each other. In addition, variation of various shapes, sizes, and the like of the back plate and the backlight module and combination of various variations as described above can be used in all the assembly methods of the backlight module, and can generate a similar technical effect, with reference to the foregoing description.

After arrangement of the light guide plate and the LED light bar as described above are completed, a reflection sheet, a diffusion sheet, and a brightness enhancement film, etc., may be further provided.

In one embodiment, portions of a base of the LED light bar located on both sides of the LED chip in a width direction of the base may be respectively attached to, for example, the second main surface side of the back plate and a portion of the surface of the light guide plate close to the first main surface and exposed out of the hollow structure. By respectively attaching the portions of the base of the light bar located on both sides of the LED chip in the width direction respectively to the second main surface of the back plate and the portion of the surface of the light guide plate, it is possible to improve stability of attaching the light bar, and to avoid tortuosity and deformation of the light bar, when it is subjected to an external force.

In one embodiment, the method for providing the light guide plate on a first side of the back plate is: providing a positioning line on the first main surface side of the back plate, and mounting the light guide plate in place according to the positioning line. By providing the positioning line, it is possible to mount the light guide plate in place more conveniently and accurately, and to improve efficiency of assembly.

A method for fixing the light guide plate on the first main surface side of the back plate is, for example: attaching a side of the light guide plate away from the extension portion and the first main surface to each other; and a method for fixing the LED light bar is, for example: attaching the same with a double-sided tape to the second main surface of the back plate.

In this text, terms such as "first" and "second" are only used for differentiating one entity or operation from another entity or operation without requiring or implying that these entities or operations have any such actual relationship or sequence. Terms "comprise", "include" or other variants are open-ended expression, which does not exclude processes, methods and articles included therein, and presence of other elements. It should be explained that directional or positional relationships shown by terms such as "upper", "lower" are directional or positional relationships shown as in the drawings, which only means to facilitate description of the invention and simplify the description, but do not indicate or imply that the devices or components must have specific directions, or be constructed or operated in the specific directions, and are not limitative of the invention. Unless expressly stipulated or defined, terms "mounted", "connected" and "linked" should be broadly understood, for example, they may be fixedly connected, detachably connected, or integrally connected; may be mechanically connected or electrically connected; or may be directly connected, indirectly connected by a medium, or internally communicated between two components. For those ordinarily skilled in the art, the specific meanings of the terms in the present disclosure can be understood according to specific conditions.

The foregoing embodiments merely are exemplary embodiments of the present disclosure, and not intended to define the scope of the present disclosure, and the scope of the present disclosure is determined by the appended claims.

The present application claims priority of Chinese Patent Application No. 201610281018.2 filed on Apr. 27, 2016, the present disclosure of which is incorporated herein by reference in its entirety as part of the present application.

The invention claimed is:

1. A backlight module, comprising:
   a back plate, comprising a main body portion, the main body portion having a first main surface and a second main surface opposite to each other; and the main body portion, being provided with a hollow structure;
   a light source, passing through the hollow structure from a second main surface side of the main body portion, and a light-emitting portion of the light source being exposed on a first main surface side of the main body portion;
   a light guide plate, provided on the first main surface side of the main body portion of the back plate,
   wherein, the light-emitting portion of the light source includes a light emergent surface, and the light emergent surface faces a light incident surface of the light guide plate,
   the hollow structure is provided at a portion of the main body portion close to a first edge thereof, and the back plate further comprises a first bent portion bent from the first edge of the main body portion toward the first main surface side, and a second bent portion bent from an edge of the first bent portion away from the main body portion toward a middle portion of the main body portion, the second bent portion and the main body portion are spaced apart from each other and at least partially overlap in a direction perpendicular to the first main surface,
   the hollow structure extends parallel to the first edge, a portion of the main body portion close to the first edge includes a step structure, so that the main body portion is divided into a first portion and a second portion that are staggered in a direction perpendicular to the first main surface, and the hollow structure is located in the first portion.

2. The backlight module according to claim 1, wherein, the light incident surface of the light guide plate is at least one side surface of the light guide plate.

3. The backlight module according to claim 1, wherein, the light source includes a strip base and a light-emitting portion provided on the strip base, and the strip base is located on the second main surface side of the main body portion, the light-emitting portion passes through the hollow structure so that the light emergent surface is exposed on the first main surface side of the main body portion.

4. The backlight module according to claim 3, wherein, the light emergent surface of the light-emitting portion of the light source is located on a side surface of the light-emitting portion facing the light incident surface of the light guide plate.

5. The backlight module according to claim 1, wherein, an end portion of the light guide plate provided with the light incident surface is located between the second bent portion and the main body portion.

6. The backlight module according to claim 1, wherein, a distance between the first portion and the second portion of the main body portion in the direction perpendicular to the first main surface is substantially the same as a thickness of the strip base of the light source.

7. The backlight module according to claim 1, wherein, as seen from a plan-view diagram parallel to the first main surface of the main body portion, the hollow structure includes a strip structure extending along the first edge of the main body portion, and a plurality of protrusion structures protruding from the strip structure toward the first edge and arranged at intervals in a direction parallel to the first edge.

8. The backlight module according to claim 7, wherein, the light-emitting portion of the light source includes a plurality of sub-light-emitting portions arranged at intervals in an extending direction of the strip base, and the plurality of sub-light-emitting portions are respectively embedded into the plurality of protrusion structures of the hollow structure.

9. The backlight module according to claim 1,
wherein, a portion of the strip base of the light source extending beyond the hollow structure in a direction parallel to the first edge is fixed onto the second main surface of the main body portion.

10. The backlight module according to claim 1, wherein, the first bent portion is perpendicular to the first main surface, and the second bent portion is parallel to the first main surface.

11. A display device comprising the backlight module according to claim 1.

12. An assembly method of the backlight module according to claim 1, comprising:
providing the back plate, the light source, and the light guide plate;
providing the light guide plate on the first main surface side of the back plate,
making the light source pass through the hollow structure from the second main surface side of the main body portion of the back plate, so that the light-emitting portion of the light source is exposed on the first main surface side of the main body portion, and the light emergent surface of the light-emitting portion faces the light incident surface of the light guide plate.

13. A back plate for a backlight module, comprising a main body portion, the main body portion having a first main surface and a second main surface opposite to each other, wherein, the main body portion is provided with a hollow structure, the hollow structure is used for making a light source of the backlight module pass through the hollow structure from the second main surface side of the main body portion, and a light-emitting portion of the light source is exposed on a first main surface side of the main body portion, the hollow structure is provided at a portion of the main body portion close to a first edge thereof, and the back plate further comprises a first bent portion bent from the first edge of the main body portion toward the first main surface side, and a second bent portion bent from an edge of the first bent portion away from the main body portion toward a middle portion of the main body portion, the second bent portion and the main body portion are spaced apart from each other and at least partially overlap in a direction perpendicular to the first main surface, the hollow structure extends parallel to the first edge, a portion of the main body portion close to the first edge includes a step structure, so that the main body portion is divided into a first portion and a second portion that are staggered in a direction perpendicular to the first main surface, and the hollow structure is located in the first portion.

14. The back plate according to claim 13, wherein, the first bent portion is perpendicular to the first main surface, and the second bent portion is parallel to the first main surface.

15. The back plate according to claim 13, wherein, the back plate comprises an un-hollowed portion on both sides in an extending direction of the hollow structure, respectively.

16. The back plate according to claim 13, wherein, as seen from a plan-view diagram parallel to the first main surface of the main body portion, the hollow structure includes a strip structure extending along the first edge of the main body portion, and a plurality of protrusion structures protruding from the strip structure toward the first edge and arranged at intervals in a direction parallel to the first edge.

* * * * *